July 7, 1953 R. A. BAILEY 2,644,729
DUST SEAL
Filed Oct. 20, 1949
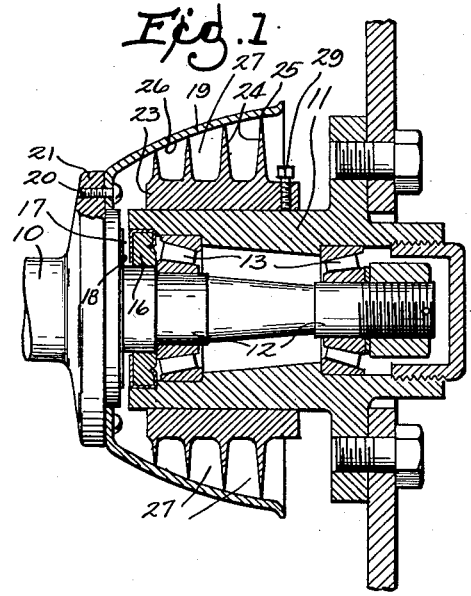
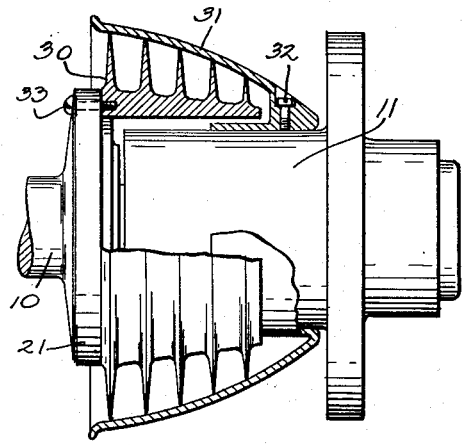
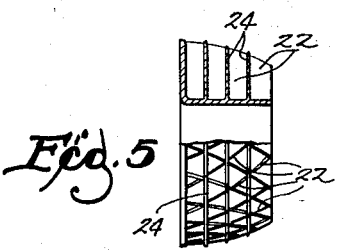
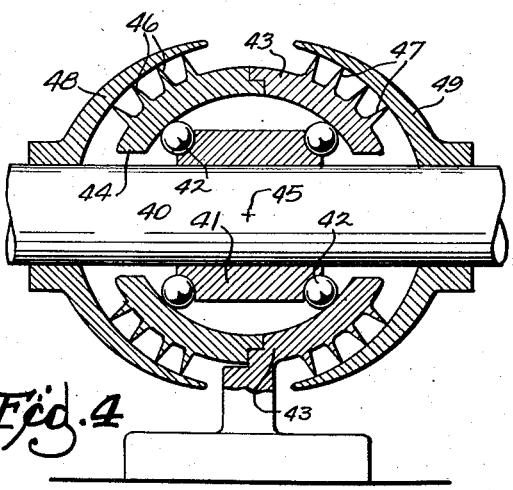
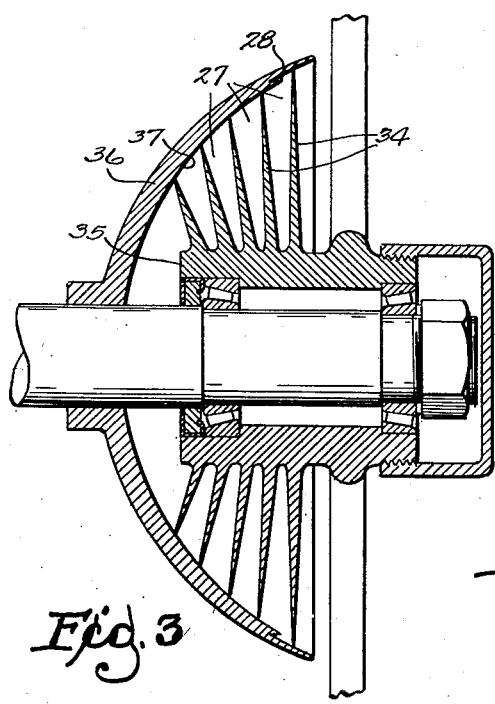
Inventor
ROBERT A. BAILEY
By Wheeler, Wheeler & Wheeler
Attorneys Patented July 7, 1953

2,644,729

UNITED STATES PATENT OFFICE 2,644,729

DUST SEAL

Robert A. Bailey, Sarona, Wis.

Application October 20, 1949, Serial No. 122,520

3 Claims. (Cl. 308—187.1)

This invention relates generally to improvements in dust seals and in particular to those applicable for the protection of bearings and the like interposed between rotary or oscillatory parts.

Bearing failure is frequently attributed to the abrasive action of foreign matter present between the bearing surfaces. This abrasive action wears away the bearing surfaces so as to create clearances between said surfaces in excess of allowable tolerances. This condition is particularly aggravated where a grease seal or the like is employed adjacent the bearing. The foreign matter becomes entrapped by the grease seal and thus the wear on the bearing is accelerated by virtue of the retention within the bearing of the entrapped abrasive. The problem is particularly acute when the bearing is subject to water splash at temperatures causing the splash to freeze on moving parts. A common example wherein this latter condition obtains is in the various wheel bearings, transmission and differential bearings and other running gear disposed at under-chassis locations on motor vehicles and mobile farm equipment.

It is the principal object of the invention to bar the entry of such foreign matter into such bearings by means of a fractionating dust seal to be hereinafter described more in detail.

It is a further object of the invention to provide in such a fractionating dust seal a simplified cooperative parts structure wherein one part may be mounted on a stationary member adjacent the bearing and the other part may be mounted on a member rotating on the bearing, and wherein the two parts are so positioned with respect to one another that a series of dust collecting chambers are formed to exponentially reduce the amount of foreign matter passing through each chamber.

Another object of the invention is to provide such a fractionating dust seal wherein the various fractionating elements are made in annular form so as to admit of die cast fabrication and result in a relatively distortionless unitary structure.

In the drawings:

Fig. 1 is an axial cross sectional view of a conventional wheel bearing and supporting axle showing one embodiment of the fractionating dust seal applied thereto.

Fig. 2 is a similar view, partly in cross section and partly in elevation, showing a modified embodiment of the invention applied thereto.

Fig. 3 is a similar view partly in elevation and partly in cross section showing a further modification of the invention.

Fig. 4 is a cross sectional view showing the form of the invention as applied to a self-centering bearing.

Fig. 5 is a fragmentary view of a modified cellular form of the dust seal.

By way of exemplification only the invention is principally shown as applied to a conventional wheel bearing. As the description proceeds, however, it will be readily apparent that the invention is equally applicable to the protection of numerous and varied forms of bearings, grease seals, and other mechanical parts such as brakes, which have movable and stationary elements upon which the various cooperating parts of the invention may be mounted.

With particular reference to Fig. 1, the conventional wheel bearing comprises a relatively stationary axle 10 and a rotary hub 11, which is mounted on the axle on tapered roller bearings 13 interposed between the bearing portions 12 of the axle and the hub. As the details of the bearing constitute no part of this invention, and are already well understood in the art, no further reference will be made thereto, except as is necessary to fully describe the related functions of the dust seal, and to point out that a grease seal 16 is desirably included at the open end of the hub 11 in order to retain a lubricant within the bearing.

When the hub 11 is properly positioned upon the bearing 13 a clearance space 17 is necessarily left between the inner face 18 of the stationary axle 10 and the grease seal 16. It is through this space 17 that undesirable foreign matter, which may include dust, dirt and water splash, commonly finds its way to entrapment with the grease seal.

For the purpose of barring entry of such foreign matter into this space, a fractionating dust seal is provided which tends to exclude from such space, and areas immediately adjacent thereto, all such foreign matter.

The dust seal comprises a hollow drum 19 which may, in one embodiment, be fixed to the flange portion 21 of stationary axle 10 by means of bolts 20 or the like. The drum extends from said stationary axle over the hub 11 which rotates out of contact therewithin. The dust seal further comprises a fractionating baffle, mounted on the hub within the drum, which has a base portion 23 and a plurality of laterally spaced upstanding annular fins 24, which project outwardly of the base and which have peripheral edges 25 in intimately spaced relation with respect to the inner surface 26 of the hollow drum. The fractionating baffle may be adjusted axially on the hub with respect to the drum by means of the set screw 29 or the like.

Although broadly immaterial, the hollow drum 19 is preferably made in concavo-convex form having an incurved inner surface. The diameter of the inner surface progressively increases from its mounting portion to its flared lip remote from the mounting. Similarly the peripheral edges 25 of the respective spaced fins 24 are diametered complementary with said drum surface so that the various fin peripheries will simultaneously assume substantially equally intimately spaced relation with the incurved drum surface. The various fins 24 are spaced laterally upon the base 23 so as to provide chambers 27 between the fins, said chambers being substantially closed by the incurved surface 26 of the drum.

On the initial application of the baffle to the hub it has been found desirable to so adjust the axial alignment of drum and fins as to contact the peripheral edges 25 of the fins 24 with the incurved surface 26 of the drum. Upon rotation of the hub 11 such peripheral edges will score slightly the incurved drum surface so as to cut arcuate grooves in said surface. The fin edges 25 are desirably thin, or knife edged, consistent with strength, so as to readily score the surface 26 and to ride within the said score lines in intimately spaced relation thereto. Although it is broadly unnecessary to the invention to provide such grooves, it is evident that such an arrangement will provide a closer fit between the edges 25 and the incurved drum surface 26.

The described fractionating construction of the baffle will reduce exponentially the amount of dust or other foreign matter tending to pass each fin from one chamber to the next and will tend to exclude such dust as does enter. The amount of foreign matter ultimately entering the space 17 is thereby reduced to a negligible amount.

In using the expression "fractionating" I refer to what I believe to be the physical action characteristic of my bearing seal. After a period of use a relatively large amount of debris and grit accumulates in the outermost chamber 27, and lesser amount of such extraneous matter are to be found in each successive chamber 27 in the direction of the bearing itself. It appears, therefore, that each successive quiescent zone in each chamber 27 constitutes a deterrent factor in the progress of dust and debris toward the bearing, and that there is a constant tendency at the lower half of my bearing seal to move the debris out of the seal and discard it completely. This exclusion is, of course, assisted by gravity and, with some rapidly moving rotating parts, the centrifugal effect is obvious.

In any event, it is a fact that upon the use of my bearing seal I find that in the multiplicity of chambers 27, by successive occlusion and expulsion there is a lesser accumulation of debris, and in this manner the fractionating operation of my seal becomes evident.

It is readily understood that such a fractionating structure will bar the entry of foreign matter suspended in the air, such as dust, and will also reject projected matter such as dirt, water splash and the like. The incurved surface of the drum 19 may be optionally provided with an annular notch 28 or the like, as shown in Fig. 3, to further insure against the admission of water past the first chamber 27. The inner surface 26 of the drum 19 may be similarly arcuately notched adjacent every other chamber if desired.

The annular shape of the fins 24, and their taper from relatively wide base portions to their thin knife edges 25, makes them particularly adaptable to fabrication by die cast methods, and such form renders them inherently strong and resistant to distortion. However, it may be desirable to segment the chambers 27, transversely of the fins 24, with webs 22 or the like, thereby forming a cell-like structure of exceptional strength, and which does not detract from the fractionating action of the seal. This cellular structure is fragmentarily shown in Fig. 5 of the drawings.

In Fig. 2 an alternate construction is shown wherein the drum 31 is mounted on the rotary element and is axially adjustable thereon by means of a set screw 32 or the like. The fractionating baffle member 30 is mounted on the flanged portion of the stationary member by means of the bolts 33 or the like.

In Fig. 3 a slight modification of the construction shown in Fig. 1 is shown wherein the fins 34 are made integral with the rotatable hub 35. Also illustrated in Fig. 3 is a hemispherical form of the drum 36. In order to better accommodate themselves to this hemispherical drum form, the various fins 34 are progressively inclined toward the axle in order that the peripheral edges of the fins meet the inner surface 37 of the drum more nearly at right angles.

In Fig. 4 the invention is shown as applied to a self centering bearing. A rotatable shaft 40 is shown carried on the bearing cone 41 which seats ball bearings 42 or the like in contact with the stationary spherical raceway 43 which has open ends 44 through which the rotating shaft 40 extends. This construction permits the shaft 40 to rotate freely to a limited extent in any direction about an imaginary center 45.

The stationary raceway 43 carries at its external spherical periphery a double series of radial annular fins 46 and 47, of quite similar construction to those heretofore described; each fin, however radiates from the imaginary center 45. The shaft carries twin hollow drums 48 and 49 at each of its projections from the self-centering bearing, which drums have spheroidal inner surfaces and are axially alignable with respect to the fins 46 and 47 so as to come into intimately spaced relation thereto. A proper adjustment of the drums will align their spherical centers coincident with center 45. Thus, any form of shaft rotation on bearings 42 will necessarily result only in spherical rotation of the drums about the center. In this construction the spacing is such that the fins do not score the drums and the drums are free to rotate in a constant spaced relation with the fins as the shaft 40 is swung about the center 45. The fractionating effect of the fins 46 and 47, forming chambers between the fins and the inner surface of the drums, is comparable to and follows practically the same principle described in connection with the embodiment of Fig. 1.

It is thus evident that in all the embodiments described, a fractionating baffling action is effected between a series of projecting fins disposed in intimately spaced relation to a drum whereby a bearing, joint, or any other protected machine element may be effectively isolated from foreign matter.

I claim:

1. In a dust seal assembly, the combination with inner and outer relatively rotatable bearing elements having bearing means closed at one end and open at the other, of a dust seal for the open end of said bearing means comprising inner and outer seal members respectively connected with the bearing elements, said outer member having its inner surface flaring outwardly from the inner member in a direction axially of said members away from the open end of the bearing means, and a series of annular fins on the inner member and tapering outwardly to knife edges with only running clearance in intimately spaced relation to said inner surface, said fins being progressively of greater radius from a minimum adjacent the open bearing end to a maximum at a point axially remote therefrom, whereby to provide a succession of dust fractionating chambers through which dust can reach the open bearing end only by passing a succession of said fins and a succession of intervening chambers of progressively smaller radius.

2. The device of claim 1 in which the fins are connected with a rotatable member, whereby to tend to return outwardly from said bearing means by centrifugal force dust which might otherwise penetrate the seal.

3. The device of claim 1 in which the said inner surface of the outer seal member is spherically contoured and the fins are mutually divergent in projecting thereto.

ROBERT A. BAILEY.

References Cited in the file of this patent

UNITED STATES PATENTS

| Number | Name | Date |
| --- | --- | --- |
| 1,326,690 | Rice | Dec. 30, 1919 |
| 1,503,920 | Schneebeli | Aug. 5, 1924 |
| 1,614,120 | Halliwell | Jan. 11, 1927 |
| 1,780,804 | Ward | Nov. 4, 1930 |
| 1,922,076 | Brittain | Aug. 15, 1933 |
| 2,044,692 | Huhn | June 16, 1936 |
| 2,058,993 | Keller | Oct. 27, 1936 |
| 2,063,570 | Wallgren | Dec. 8, 1936 |

FOREIGN PATENTS

| Number | Country | Date |
| --- | --- | --- |
| 227,315 | Great Britain | 1925 |